No. 615,615. Patented Dec. 6, 1898.
J. G. GIBSON.
APPARATUS FOR SEEDING FRUIT.
(Application filed Sept. 9, 1897.)
(No Model.) 3 Sheets—Sheet 1.

Witnesses
D. E. Burdine
Alb. Burdine

Inventor
JOSEPH G. GIBSON.
By Dodge & Sons,
Attys.

No. 615,615. Patented Dec. 6, 1898.
J. G. GIBSON.
APPARATUS FOR SEEDING FRUIT.
(Application filed Sept. 9, 1897.)
(No Model.) 3 Sheets—Sheet 2.

Witnesses: Inventor:
JOSEPH G. GIBSON.
By Dodge & Son, Attys

No. 615,615.
J. G. GIBSON.
APPARATUS FOR SEEDING FRUIT.
(Application filed Sept. 9, 1897.)
Patented Dec. 6, 1898.
(No Model.)
3 Sheets—Sheet 3.
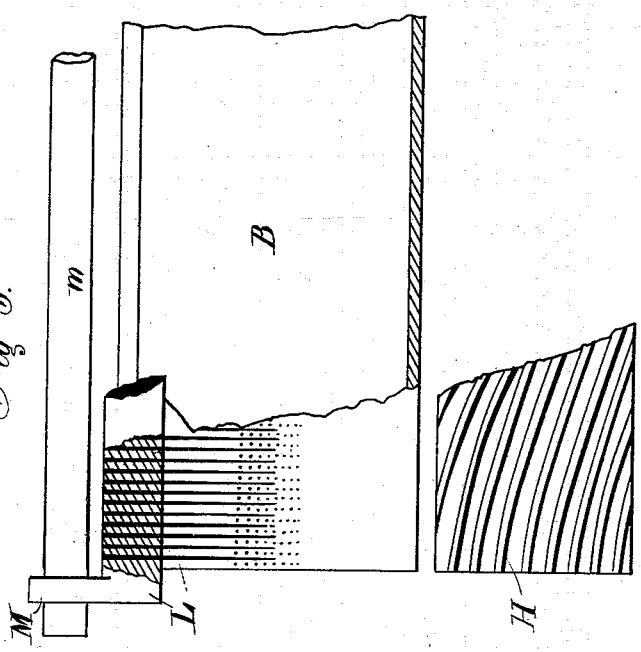
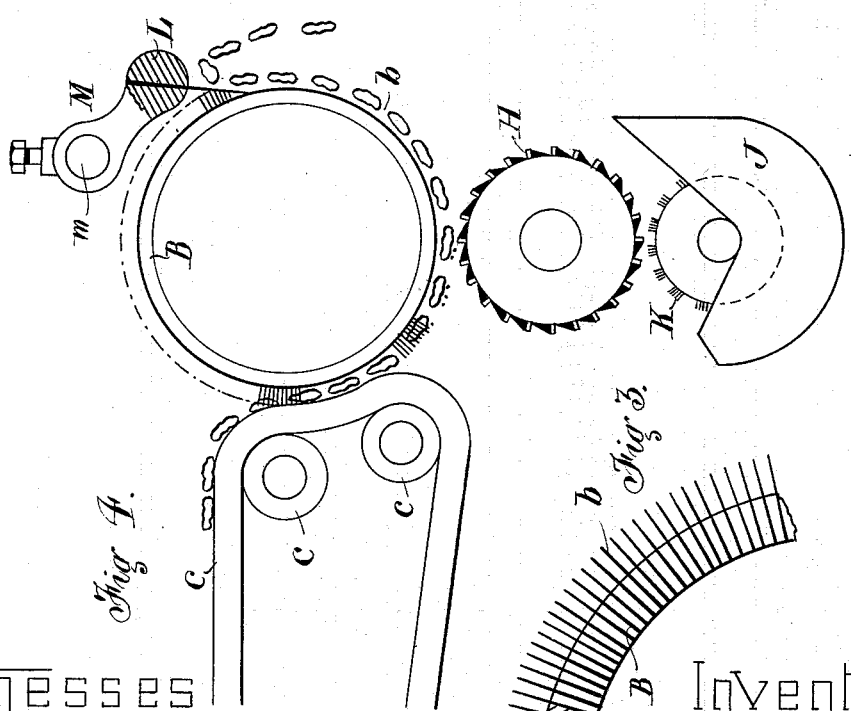
Witnesses
D. E. Burdine
U. C. Burdine
Inventor
JOSEPH G. GIBSON.
BY Dodge Sons, Att'ys.

UNITED STATES PATENT OFFICE.

JOSEPH GRANT GIBSON, OF WATERLOO, ENGLAND.

APPARATUS FOR SEEDING FRUIT.

SPECIFICATION forming part of Letters Patent No. 615,615, dated December 6, 1898.

Application filed September 9, 1897. Serial No. 651,101. (No model.)

*To all whom it may concern:*

Be it known that I, JOSEPH GRANT GIBSON, manufacturer, a subject of the Queen of Great Britain, residing at Waterloo, near Liverpool, in the county of Lancaster, England, have invented certain new and useful Improvements in Apparatus for Seeding Fruit, of which the following is a specification.

This invention relates to apparatus for seeding fruit, more especially dried fruit, such as raisins, &c. The devices which have hitherto been used and in which the raisins have been impaled upon closely-set disks with teeth and mounted on a spindle or shaft have been ineffectual in seeding the fruit without seriously mutilating it and spoiling its natural form and appearance, so that the fruit after being so seeded does not command a ready sale. The object I have had in view in designing my present apparatus is to avoid these defects and to so remove the seed by an impaling action that the fruit shall not be mutilated or torn or its natural form destroyed.

By my present invention I impale the fruit on a revolving impaling-roll formed with closely-set slender blunted needles by the pressure of a feeding-belt of rubber or other resilient material, such blunted needles being made to perforate through the soft skin on one side of the fruit and, coming against the hard seeds or stones, force them out through the skin on the opposite side of the fruit in contact with the resilient belt, the action of impalement and expelling the seeds through the skin being performed in a single operation in place of being separately effected, as hitherto.

The invention will be understood from the following description, reference being had to the accompanying drawings, in which—

Figure 1:
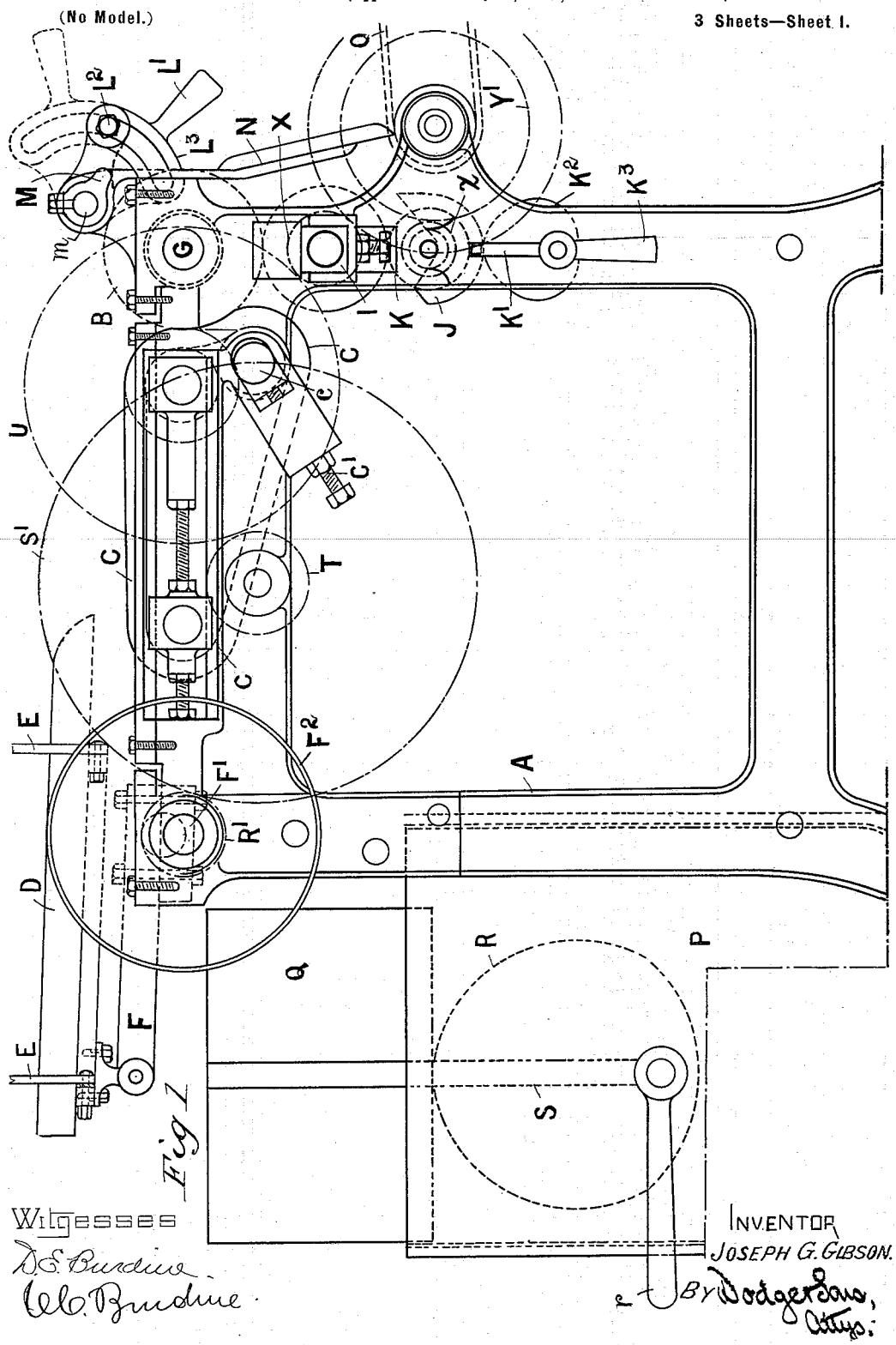
Figure 2:
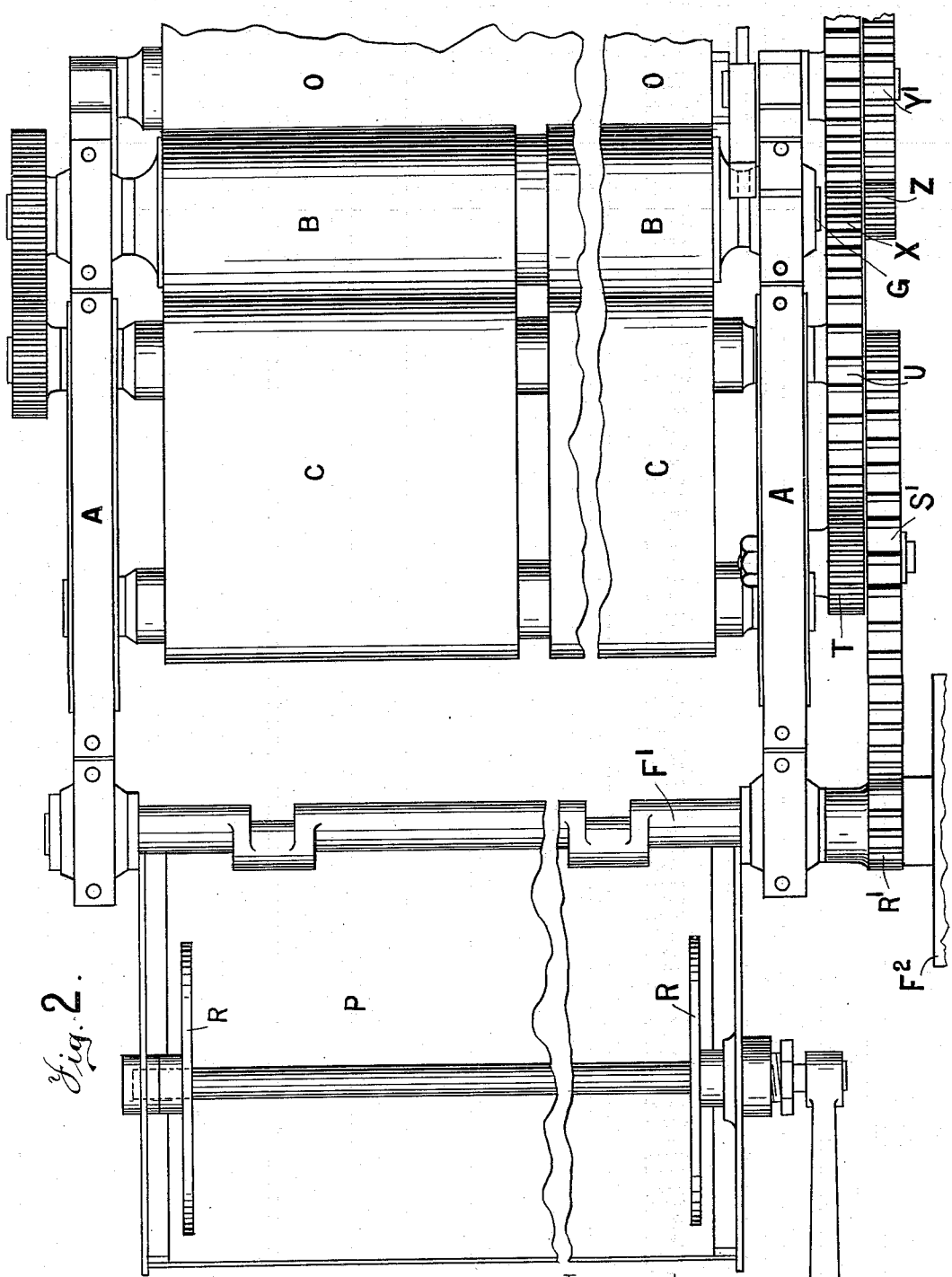

Figure 1 is a front elevation of a machine embodying my improvements; Fig. 2, a plan; Fig. 3, a sectional view showing a fragment of the impaling device; Fig. 4, a detail view in cross-section of the devices for separating the seeds from the flesh of the fruit; Fig. 5, a detail view of the device for removing the seeded fruit from the impaling device; Fig. 6, a fragmentary view of the device for removing the separated seeds from the impaling-points.

Referring to the figures, A is the frame of the machine; B, the roll with closely-set pins or needles $b$, on which the fruit is impaled for the purpose of removing the seeds; C, an endless belt, made of rubber or other material, which carries the fruit from the vibrating feeding-spout D to the roll B and forces it upon the pins. This endless belt is carried on guide-rolls $c$, which are provided with adjusting devices C', whereby the tension of the belt can be adjusted as required. The vibrating spout D is suspended by the hangers E and is vibrated by means of connecting-rods F, operated by cranks $f$ on the shaft F', which shaft is rotated by the driving-pulleys F. The vibration of the spout D acts to agitate the fruit and deliver it onto the belt C in a single layer, by which it is carried to the roll B, where the fruit is impaled.

The roll B is composed of a hollow cylinder (a fragment of which is shown on an enlarged scale in Fig. 3) having a large number of closely-set pins $b$ projecting therefrom, the pitch of which is less than the average size or diameter of the seeds of the fruit, so that the seeds cannot get between the pins, and the impaling action is certain to expel the seeds from the flesh of the fruit. The pins or needles are made of very slender steel wire, so as to perforate only minute holes in the skin, and they are by preference made with blunted points in such a manner that the seeds shall not be themselves impaled thereby, but shall be forced out of the fruit through the skin by the blunted points of the pins forcibly pressing against them. The cylinder may be made in a series of sections or lengths of about six inches or twelve inches in length, so that should any of the impaling-pins be broken in impaling the fruit any individual section can be removed from the cast-iron roller G, mounted on shaft G', journaled in bearings in the frame, and replaced by another kept in reserve. The pins $b$ are by preference tapered and driven through the hollow roll B from the inside. This construction enables me to easily effect repairs, as any individual section can be removed from the cast-iron roller, and the broken pins driven out of the holes and replaced by new pins.

The endless belt C is so arranged that for a short distance it shall follow in close proximity the curvature of the impaling-roll in such a manner that the belt shall act as a resilient bed or presser for the purpose of impaling the fruit on the pins. The result is that the skin and flesh of the fruit are impaled by the pins; but the hard seeds or stones inside the raisins as they come against the impaling-pins are forced out through the skin and entirely eliminated from the fruit, which during this process is bedded against the rubber bed, the seeds themselves after elimination adhering to the points of the pins. The belt being of a soft and resilient nature is a very important feature, as the fruit is bedded against it during the process of impalement and elimination of the seeds, and it is largely on this rubber belt or bed that I rely for preventing undue rupture, mutilation, or destruction of the fruit's natural form.

H are rotary spiral blades journaled in the bearings I and rotating at about six times the speed of the impaling-roll, the function of which is to remove the eliminated seeds from the impaling-points of the pins, from whence they fall onto the floor.

K is a brush rotating in hot water in the tray J for cleaning the spiral blades and preventing any accumulation of saccharine matter thereon. This tray slides in vertical guides K' and is supported at the required height by the cam $K^2$, operated by the handle $K^3$. By a turn of the handle therefore this tray can be raised or lowered, as required, to clean out the tray.

L is a comb or stripper secured to the crank M on the shaft $m$, so as to be adjustable. The prongs of this comb pass between the pins $b$ and rest on the roll-surface, in which position the comb is tangential to the roll. This stripper has for its purpose to remove the seeded fruit from the impaling-pins, which then falls onto the inclined chute N and so onto the belt O, which conveys the seeded fruit to the packing-room. The stripper L can be removed from the pins for cleaning purposes by turning the handle L' and it can be locked in or out of engagement with the pins by turning the nut $L^2$, which locks the quadrant $L^3$ in the desired position. The chute N can also be raised on its pivot $m$ for the purpose of more easily getting at the tray J.

P is a tank filled with suitable liquid for cleansing the raisins; Q, a gauze or perforated vessel in which the raisins, unseeded but freed from their stalks, are placed; R, a cam with handle $r$ for raising or lowering the said vessel Q, and S a guide in which the vessel travels in a vertical path.

The mode of operation is as follows: If raisins are being operated upon, a quantity is filled into the vessel Q, the vessel lowered by turning the handle $r$ into the tank, where they are submerged in the liquid therein. After an immersion of a few seconds the vessel Q is raised and the fruit allowed to drain into the tank, after which the fruit is placed by hand on the vibrating spout and fed onto the belt and so delivered to the impaling-roll, where it is pressed in a single layer against the pins by the rubber belt and impaled. Their seeds, however, being hard are not themselves impaled, but are separated from the flesh of the fruit and forced out through the skin, leaving the impaled fruit on the roll free from seeds, the seeds themselves adhering to the points of the pins. The skin of the raisins at that part where the seeds are forced out is bedded against the resilient rubber belt, and this prevents undue straining of the skin and consequent rupture or tearing, so that the fruit is not mutilated or its natural form destroyed. The impaling-roll as it rotates brings the eliminated seeds to the rotary spiral blades H, where the seeds are removed, as already described, the seeded raisins themselves being carried round by the roll until they come to the stripper L, where they are removed from the pins and delivered onto the delivery-belt O, as previously explained.

The apparatus is by preference driven by a train of toothed wheels, the guide-roll deriving its motion from the crank-shaft through the wheels R' S' T U and the impaling-roll from the pinions V and W. The spiral blades are driven by the pinion X off the wheel U, and this pinion also drives the wheel Y, which operates the belt O, while the wheel Y' drives the brush by the pinion Z.

I declare that what I claim is—

1. In a machine for seeding fruit, the combination of a spiked impaling-roll; a resilient surface movable in proximity to said roll, and means for supporting said surface so as to present a concave face to the roll, substantially as described.

2. In a machine for seeding fruit, the combination of a spiked impaling-roll; a resilient surface passing in proximity to the roll and following the contour thereof; and means for imparting motion to said roll and surface, substantially as described.

3. In a machine for seeding fruit, the combination of a spiked impaling-roll; a resilient feeding-belt working in proximity to said roll, and supports for said belt also in proximity to said roll, whereby that portion of the belt intermediate the supports and next to the roll presents a concave surface, substantially as described.

4. In a machine for seeding fruit, the combination of a suitable frame, a spiked impaling-roll mounted therein; an endless belt C formed of resilient material; supports $c\ c$ for the belt located in proximity to the roll, and means for adjusting said supports toward and from the roll, whereby the concavity of that portion of the belt next to the roll may be varied and the pressure exerted thereby regulated.

5. The combination of a toothed impaling-cylinder; a resilient feeding-belt, and supports for said belt whereby the portion of the belt next to the perimeter of the impaling-roll is enabled to present a concave surface thereto.

6. In a raisin-seeding machine, the combination of an impaling-cylinder; a pair of rolls working in proximity to the surface of said cylinder; an impaling-belt engaging said rolls and closely held against the working face of the impaling-cylinder; and means for feeding raisins in the path of movement of said impaling-belt and also removing the seeded raisins from the cylinder.

In testimony whereof I have signed my name to this specification in the presence of two subscribing witnesses.

JOSEPH GRANT GIBSON.

Witnesses:
G. C. DYMOND,
W. H. BEESTON.